United States Patent
Neal et al.

(10) Patent No.: US 8,804,977 B2
(45) Date of Patent: Aug. 12, 2014

(54) NONLINEAR REFERENCE SIGNAL PROCESSING FOR ECHO SUPPRESSION

(75) Inventors: Timothy J. Neal, West Ryde (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 315 days.

(21) Appl. No.: 13/422,679

(22) Filed: Mar. 16, 2012

(65) Prior Publication Data

US 2012/0237047 A1 Sep. 20, 2012

Related U.S. Application Data

(60) Provisional application No. 61/454,175, filed on Mar. 18, 2011.

(51) Int. Cl.
H04B 3/20 (2006.01)
(52) U.S. Cl.
USPC ............. 381/66; 381/93; 381/94.1; 381/71.1; 381/71.11; 381/83; 381/92; 381/94.3; 704/225; 704/226
(58) Field of Classification Search
USPC ............ 381/66, 93, 94.1, 71.1, 71.11, 83, 92, 381/94.3; 704/225, 226; 700/94
See application file for complete search history.

(56) References Cited

U.S. PATENT DOCUMENTS

| | | | |
|---|---|---|---|
| 4,669,116 A | 5/1987 | Agazzi et al. | |
| 5,148,427 A | 9/1992 | Buttle et al. | |
| 5,305,307 A | 4/1994 | Chu | |
| 5,504,841 A | 4/1996 | Tani | |
| 5,659,609 A | 8/1997 | Koizumi et al. | |
| 5,796,819 A | 8/1998 | Romesburg | |
| 6,658,107 B1 | 12/2003 | Sörqvist et al. | |
| 6,842,516 B1 | 1/2005 | Armbrüster | |
| 7,062,040 B2 | 6/2006 | Faller | |
| 7,277,538 B2 | 10/2007 | Parry | |
| 7,602,867 B2 | 10/2009 | Kolze et al. | |
| 2003/0031315 A1 | 2/2003 | Belt et al. | |
| 2003/0185402 A1 | 10/2003 | Benesty et al. | |
| 2006/0018460 A1 | 1/2006 | McCree | |

(Continued)

FOREIGN PATENT DOCUMENTS

| | | |
|---|---|---|
| WO | WO 96/08879 | 3/1996 |
| WO | WO 98/33311 | 7/1998 |

(Continued)

OTHER PUBLICATIONS

Faller, Christof, "Perceptually Motivated Low Complexity Acoustic Echo Control" AES Convention paper 5783, presented at the 114th Convention, Mar. 22-25, 2003, Amsterdam, The Netherlands, pp. 1-7.

(Continued)

*Primary Examiner* — Paul Kim
(74) *Attorney, Agent, or Firm* — Dov Rosenfeld; Inventek

(57) ABSTRACT

An echo suppression system and method, and a computer-readable storage medium that is configured with instructions that when executed carry out echo suppression. Each of the system and the method includes the elements of a linear echo suppressor having a reference signal path, with a nonlinearity introduced in the reference signal path to introduce energy in spectral bands. Unlike an echo canceller, the echo suppression system and method are relatively robust to errors in the introduced nonlinearity.

29 Claims, 11 Drawing Sheets

(56) References Cited

U.S. PATENT DOCUMENTS

| | | |
|---|---|---|
| 2006/0034448 A1 | 2/2006 | Parry |
| 2008/0240413 A1 | 10/2008 | Mohammad et al. |
| 2008/0247536 A1 | 10/2008 | Rahbar |
| 2009/0063142 A1 | 3/2009 | Sukkar |
| 2009/0214048 A1 | 8/2009 | Stokes, III et al. |
| 2009/0238373 A1 | 9/2009 | Klein |
| 2009/0310796 A1* | 12/2009 | Seydoux .................... 381/71.1 |

FOREIGN PATENT DOCUMENTS

| | | |
|---|---|---|
| WO | WO 2009/035613 | 3/2009 |
| WO | WO 2009/082194 | 7/2009 |
| WO | PCT/US2012/024370 | 2/2012 |

OTHER PUBLICATIONS

Stenger, A., et al., "Nonlinear Acoustic Echo Cancellation with Fast Converging Memoryless Preprocessor" Jun. 2000, IEEE, pp. 805-808.

Stenger, A., et al., "Adaptive Volterra Filters for Nonlinear Acoustic Echo Cancellation" Proc. NSIP 99 (Nonlinear Signal and Image Processing), Antalya, Turkey, Jun. 20-23, 1999.

Avargel, Y., et al., "Nonlinear Acoustic Echo Cancellation Based on a Multiplicative Transfer Function Approximation", Proc. Int. Workshop Acoust. Echo Noise Control, 2008, pp. 1-4.

Hoshuyama, O., et al., "Nonlinear Echo Cancellation Based on Spectral Shaping" Speech and Audio Processing in Adverse Environments, Signals and Communication Technology, 2008, 267-283.

Nollett, B., et al., "Nonlinear Echo Cancellation for Hands-Free Speakerphones" Proc., NSIP, Sep. 8-10, 1997, Michigan, US.

Birkett, A.N., et al., "Nonlinear Loudspeaker Compensation for Hands Free Acoustic Echo Cancellation" Electronics Letters, Jun. 1996, pp. 1063-1064.

Avargel, "On Multiplicative Transfer Function Approximation in the Short-Time Fourier Transform Domain", IEEE Signal Processing Letters, vol. 14 No. 5, May 2007.

Faller et al, "Suppressing Acoustic Echo in a Spectral Envelope Space", IEEE Transactions on Speech and Audio Processing, vol. 13 Issue 5, Sep. 2005.

Fermo et al, "Analysis of Different Low Complexity Nonlinear Filters for Acoustic Echo Cancellation", Journal of Computing and Information Technology—CIT 8, 2000, 4, 333-339.

Stenger et al, "An Acoustic Echo Canceller with Compensation of Nonlinearities", Proc. IX European Signal Processing Conference, Sep. 1998, pp. 969-972.

Stenger et al, "Nonlinear Acoustic Echo Cancellation with $2^{nd}$ Order Adaptive Volterra Filters", IEEE International Conference on Acoustics, Speech, and Signal Processing, Mar. 1999.

\* cited by examiner

NONLINEAR REFERENCE SIGNAL PROCESSING FOR ECHO SUPPRESSION

RELATED APPLICATION(S)

The present application claims priority to U.S. Provisional Application No. 61/454,175 filed 18 Mar. 2011, the contents of which are incorporated herein by reference in their entirety.

FIELD OF THE INVENTION

The present disclosure relates generally to signal processing and more specifically to echo suppression.

BACKGROUND

As voice communication such as hands-free voice communication, and communication over wireless devices such as headsets becomes more ubiquitous the need for acoustic echo removal is becoming increasingly important. A typical hands free voice communication system includes one or more microphones and one or more loudspeakers. Additional components include an amplifier and an analog-to-digital converter (ADC) to generate an input signal. One or more output signals that drive the loudspeaker(s) are converted to analog form to drive the loudspeakers. Echoes may be caused by feedback from the loudspeaker(s) to the microphone(s), so that the microphone(s) pick up both a desired signal, e.g., voice of a local talker, and the sound from the loudspeaker(s), e.g., voice of a remote talker being output from the loudspeaker(s), that is, the output signal.

A traditional echo canceller takes a corrupted microphone signal and removes the acoustic echo from the loudspeaker output. In such an echo canceller, the feedback path is assumed to be a linear time invariant system that can be modeled with in impulse response. That impulse response is estimated with an adaptive linear filter that predicts the echo from an echo reference signal created from the output signal or a signal related thereto. The predicted echo from the adaptive filter is subtracted from the input. The goal of the adaptive filter of a traditional echo canceller is to model the feedback response of the feedback path sufficiently accurately such that the output of the adaptive filter matches the echo component in the microphone signal. One key issue with echo cancellation systems is the sensitivity to errors in the modeling of the feedback system response. If there is error in this model then the cancellation signal may reinforce the echo rather than remove it.

Echo suppression overcomes some of the disadvantages of echo cancellation. A fundamental difference between echo suppression and echo cancellation is that a suppressor does not subtract an estimate of the echo from the microphone signal. Rather the suppressor, in one version, calculates frequency domain suppression gains based on the estimated spectral content due to echo in the input signal, and applies the calculated gains to the input signal to suppress the echo. The echo reference signal is used indirectly to adapt the feedback system model from which the suppression gains are derived. The estimation of spectral content operates on frames of samples and with reasonably wide spectral bands. Hence, there is inherent tolerance for uncertainty in what is used as the reference signal compared to an echo cancelling system.

Significant nonlinear behavior has been observed in many of the audio components commonly used, and such nonlinear behavior can cause error in the modeling. When an echo cancellation method attempt to address nonlinear behavior in the feedback system response, care must be taken to ensure the nonlinearities are modeled accurately.

DESCRIPTION OF EXAMPLE EMBODIMENTS

Overview

Figure 1:
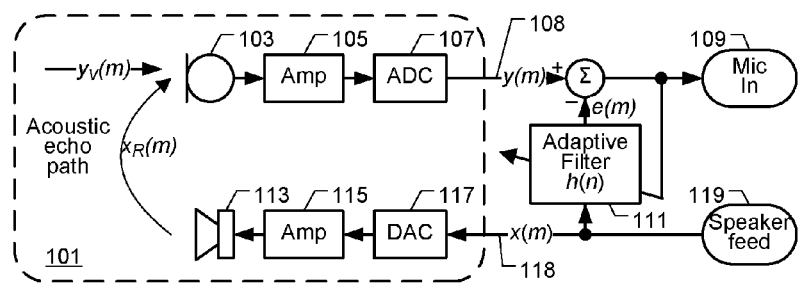
FIG. 1 shows a simplified block diagram of a typical hands free voice communication system and a typical prior art echo cancellation system.

Embodiments of the present invention include a method, and apparatus, and a non-transitory computer-readable medium, e.g., a computer-readable storage medium configured with instructions that when executed carry out the method, and logic, e.g., encoded in one or more non-transitory computer-readable media to carry out the method. The method is of echo suppression and includes purposefully introducing one or more nonlinear elements in the reference signal path of the echo prediction path.

One embodiment includes a signal processing apparatus to operate hardware in an environment having a feedback path that can potentially cause echoes. The apparatus comprises elements of an adaptive linear echo suppressor operating on a spectral amplitude metric domain and having a reference signal path. The reference signal path includes a nonlinearity to introduce energy in spectral bands in which energy is introduced by the feedback path.

One embodiment includes a signal processing apparatus comprising an input transformer and a spectral bander to accept samples of one or more input signals to form a banded frequency-domain amplitude metric of the one or more input signals for a plurality of spectral bands. The system includes a reference signal path to accept one or more reference signals and to form a banded frequency-domain amplitude metric of an echo reference signal representing the one or more reference signals, wherein the reference signal path includes a nonlinear element, such that the banded frequency-domain amplitude metric is of a nonlinearly distorted version of the one or more reference signals. In one embodiment, the reference signal path further includes a transformer and a spectral bander. The system further comprises an adaptive linear filter to accept the banded frequency-domain amplitude metric of the echo reference signal and to determine a frequency-domain amplitude metric of a predicted echo, the adaptive filter using a set of adaptively determined filter coefficients. The system further comprises a filter coefficient updater coupled to the output of the input transformer and spectral bander and to the output of the adaptive linear filter, the filter coefficient updater to update the filter coefficients. The system further comprises a suppressor coupled to the output of the input transformer and spectral bander and to the output of the adaptive linear filter, the echo suppressor to determine an echo-suppressed output signal. In one embodiment, the echo suppressor comprises a gain calculator to calculate a set of gains; and a gain applicator coupled to the output of the input transformer and to the gain calculator to apply the set of gains to the input signal, e.g., to the frequency bins of the input signal and to determine an echo-suppressed output signal, e.g., echo-suppressed frequency bins of an echo-suppressed output signal. In some versions, the nonlinearity precedes the transformer such that the transforming is of a nonlinearly distorted echo reference signal representing the one or more reference signals. In some versions, the reference signal path includes a transformer, and wherein the nonlinearity is after the transforming of the transformer, such that the nonlinear element applies nonlinear distortion in the frequency domain.

One embodiment includes a method comprising: accepting an input signal and an echo reference signal; determining a transformed frequency bin representation of the input signal for a plurality of frequency bins; and determining a transformed banded representation of an amplitude metric of the input signal for a plurality of spectral bands. The method further includes determining a transformed banded representation of an amplitude metric of the reference signal via a reference signal path. The reference signal path includes a nonlinear element, such that the transformed banded representation is of the amplitude metric of a nonlinearly distorted version of the echo reference signal. The method further includes linearly filtering the transformed banded representation by a filter that uses an adaptively determined set of filter coefficients, the filtering to determine a transformed banded representation of an amplitude metric of an estimate of an echo for suppression. The method also includes adaptively determining the filter coefficients using the banded representation of the amplitude metric of an estimate of an echo and the banded representation of the amplitude metric of the input signal. The method further includes suppressing echoes by processing the input signal according to the banded representation of the amplitude metric of an estimate of an echo and the banded representation of the amplitude metric of the input signal in order to determine an output signal.

In some method embodiments, the suppressing includes determining a set of gains to apply to the input signal to determine the output signal, e.g., a set of gains to apply to the transformed frequency bin representation of the input signal to determine a transformed frequency bin representation of the output signal. Some versions include determining a time domain set of samples of the output signal, and/or determining a frequency domain representation of the output signal for further processing.

In some method embodiments, adaptively determining the filter coefficients is gated by a double talk detector.

In some method embodiments, the method includes determining a banded spectral estimate of a noise amplitude metric. The processing of the input signal in such method embodiments is also according to the banded spectral estimate of a noise amplitude metric to achieve simultaneous echo suppression and noise suppression.

In some method embodiments, the nonlinearity in the reference signal path is in the time-sample domain before the reference signal is transformed. In some embodiments, the nonlinearity in the reference signal path is in the frequency domain.

One embodiment includes a non-transitory computer-readable medium, e.g., a computer-readable storage medium configured with instructions that when executed by one or more processors of a processing system, cause the processing system to carry out a method as described herein.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Introduction to the Technology

FIG. 1 shows a simplified block diagram of a typical voice communication system and a typical prior art echo cancellation system. The hands free voice communication system includes one or more microphones—one microphone 103 is shown in FIG. 1, and one or more loudspeakers—one speaker 113 is shown in FIG. 1. The purpose is to form a digital microphone input signal at an input terminal 109 (Mic in), and to reproduce a digital signal 118 input to a speaker out terminal 119. Additional components include an amplifier 105 and an analog-to-digital converter (ADC) 107 to generate a sampled input signal 108 denoted y(m), where m is an integer index. In general, in this disclosure, m will be used as an index for a time domain signal. The signal 118 that drives the loudspeaker 113 is denoted, in digital form, as x(m) and is converted to analog form by a digital-to-analog converter (DAC) 117 and an amplifier 115. Echoes are caused by the feedback from the loudspeaker 113 to the microphone 103, so that the microphone 103 picks up both a desired signal—the voice of a local talker, denoted $y_v(m)$, and the voice of the remote talker denoted $x_R(m)$ being output from the loudspeaker 113, that is, the version of the output signal passed by a system that represents the acoustic echo path. These physical components are shown in block 101 as a feedback system that includes the digital-to-analog converter 117, output amplifier 115, speaker 113, room response, microphone 103, input amplifier 105 and the analog-to-digital converter 107. Clearly in many systems, the physical components are more complex as would be understood by one skilled in the art.

The goal of an echo cancellation system such as shown in FIG. 1 is to take the corrupted microphone signal y(m) and remove the acoustic echo. In an echo cancellation structure the feedback system path is typically assumed to be able to be modeled as a linear and time-invariant system, so can be characterized by an impulse response, denoted $h_R(m)$. This impulse response is estimated with adaptive filter 111, e.g., a linear time-invariant adaptive filter that adapts to have an impulse response denoted h(m) with adaptively determined filter coefficients, and that operates on an echo reference signal—in this case, the signal x(m) 118 used to drive the speaker—to predict the echo therefrom to create an echo cancellation signal which is then subtracted from the input y(n). In general, the echo reference signal is derived from x(m). The goal of the adaptive filter is to model the feedback system sufficiently accurately such that the output of the filter matches the echo component in the microphone signal.

One key issue with an echo cancellation system is the sensitivity to errors in the modeling of the feedback system response. If there is error in this model then not only can the predicted cancellation signal not accurately follow the actual echo, but the cancellation signal may even reinforce the echo rather than remove it.

Most prior art echo cancellation structures use a linear adaptive filter to predict the echo for cancellation. If the feedback system response contains nonlinear components, the echo cancellation may not perform well. In most hands-free telephony devices, and in many laptop computers, size and price constraints lead to inclusion of components that include some significant level of nonlinear behavior.

Figure 2:
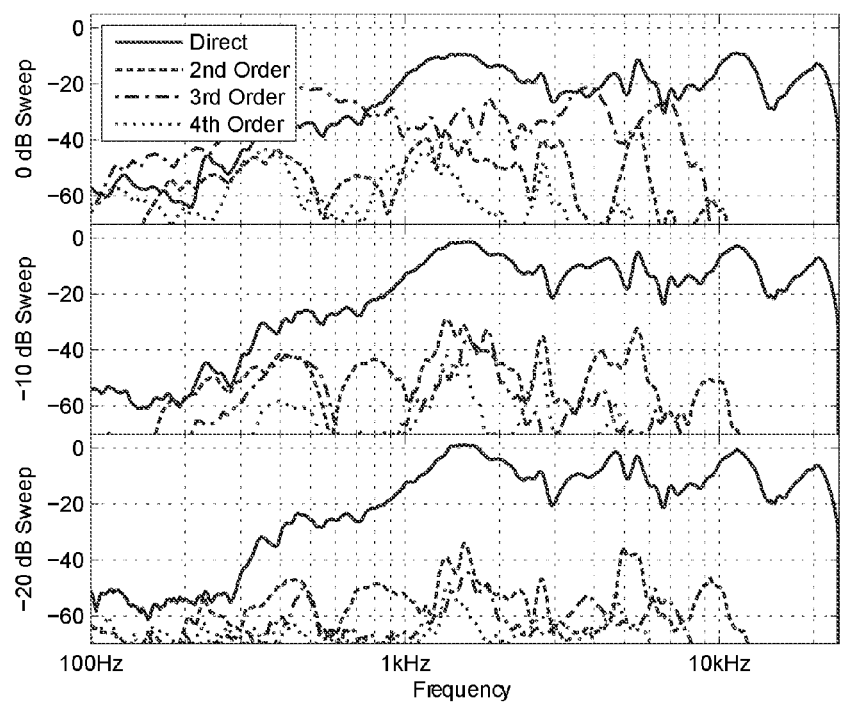
FIG. 2 shows the level of nonlinearities that are produced by the built in audio components of a leading brand laptop for three different levels of measurement sweep.

FIG. 2 shows by way of example the effect of nonlinearities that occur using the built-in audio components of a leading brand laptop, in particular, the $1^{st}$, $2^{nd}$, $3^{rd}$, and $4^{th}$, and harmonic power for three different levels of measurement sweep. Each panel indicates the frequency response of the $2^{nd}$, $3^{rd}$, and $4^{th}$ harmonics compared with the fundamental, labeled "Direct." As the level of the measurement sweep is increased initially the $2^{nd}$ harmonic dominates until the level nears full-scale where the $3^{rd}$ harmonic takes over indicating saturation in the system. In the case of this example laptop system, the nonlinear components vary in nature and level across the dynamic range of the system.

Methods are known to attempt to improve echo cancellation methods by using nonlinear estimation. If the nonlinear estimation is inaccurate, the echo canceller will not only fail to remove echo, but may introduce distortion components into the signal. Furthermore, some such methods use nonlinear models with memory, and such use of nonlinear models with memory greatly increases the computational complexity of the echo removal method.

Example Embodiments

Embodiments of the present invention include a method of echo suppression, signal processing apparatus to suppress echoes, and a non-transitory computer-readable medium such as a computer-readable storage medium configured with instructions that when executed by a processing system, cause a processing apparatus that includes the processing system to carry out the method of echo suppression. The echo suppression handles the nonlinear behavior of the feedback system between the source of the reference signal, e.g., a loudspeaker such as 113, and source of the input signal, e.g., a microphone such as 103, and the other components. The method is based on the principal of echo suppression rather than echo cancellation.

The methods and apparatuses described herein achieve echo suppression, take into account nonlinearities, are reasonably robust to error in the nonlinear model, and do not add significant complexity to echo suppression methods and apparatuses that do not include the nonlinear processing.

Figure 3A:
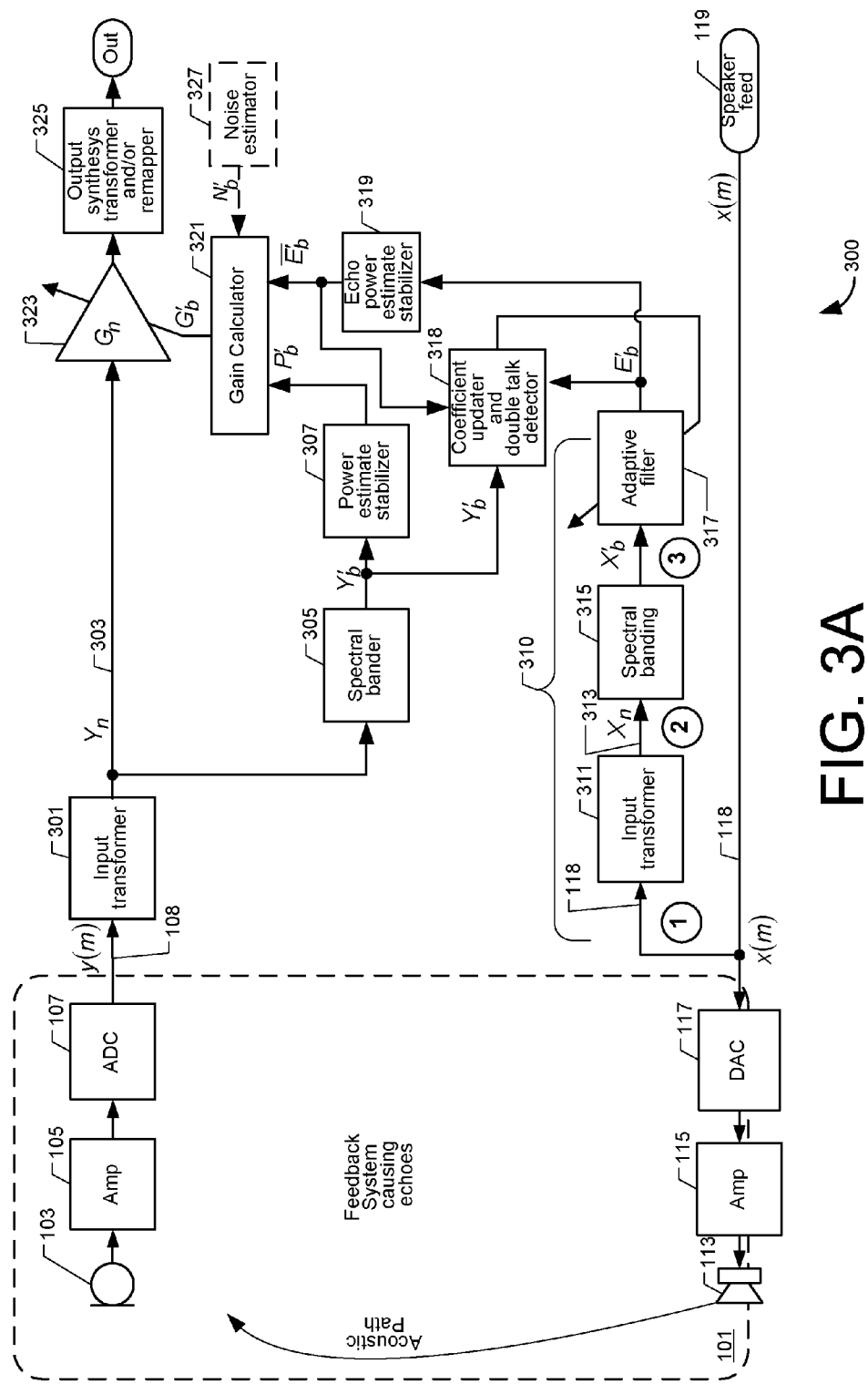
FIG. 3A shows an example embodiment of an echo suppression system that includes a reference signal path having at least one nonlinear element.
Figure 3B:
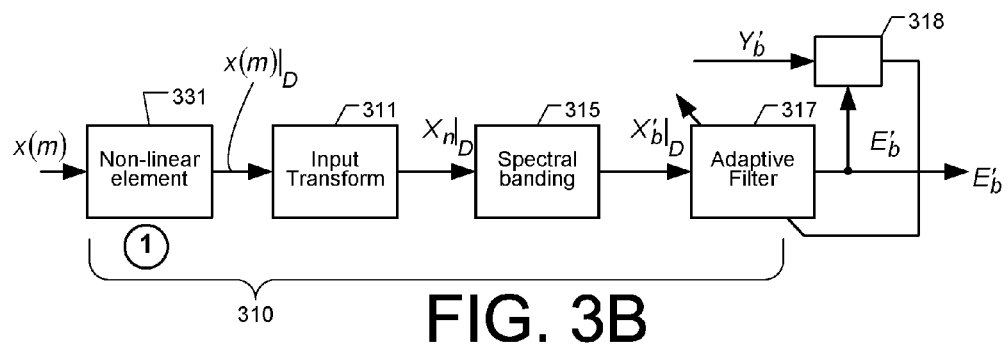
FIG. 3B shows an embodiment of a reference signal path in which a nonlinear element is included in the reference signal path prior to transforming to the frequency domain.
Figure 3C:
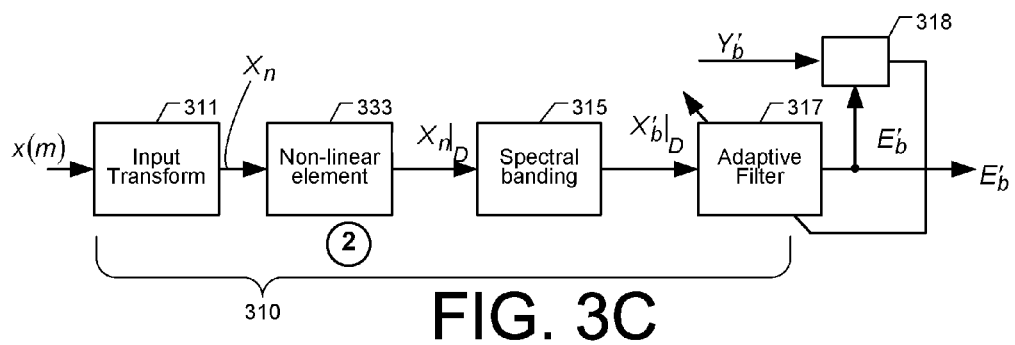
FIG. 3C shows an embodiment of a reference signal path in which a nonlinear element is included in the reference signal path after transforming to frequency bins.
Figure 3D:
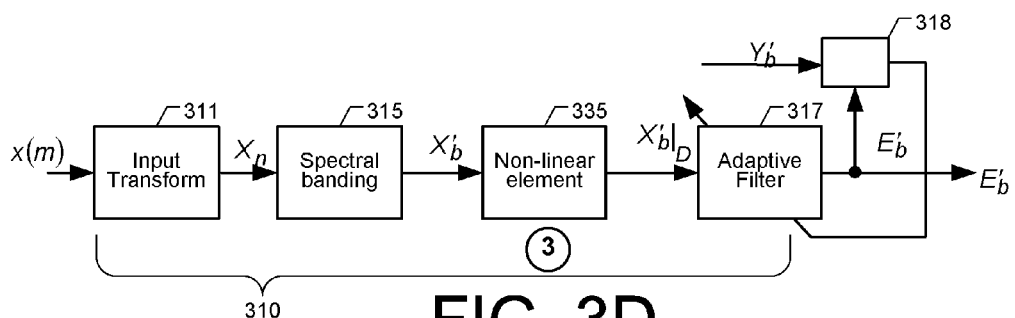
FIG. 3D shows an embodiment of a reference signal path in which a nonlinear element is included in the reference signal path after banding to spectral bands.

FIG. 3A shows an example embodiment of an echo suppression system 300 that includes a reference signal path 310 having at least one nonlinear element. The nonlinear element can be at location 1, 2, or 3, dependent on the embodiment. FIG. 3B shows a first embodiment of the reference signal path 310 in which a nonlinear element is included at position 1, that is, in the reference signal path prior to transforming to the frequency domain. FIG. 3C shows a second embodiment of the reference signal path 310 in which a nonlinear element is included at position 2, that is, in the reference signal path 310 after transforming to frequency bins. FIG. 3D shows a third embodiment of the reference signal path 310 in which a nonlinear element is included at position 3, that is, in the reference signal path 310 after banding to spectral bands.

A fundamental difference between echo suppression and cancellation is that a suppressor does not subtract an estimate of the echo component from the microphone signal. Rather the suppressor includes calculating frequency domain suppression gains and applying the gains in the frequency domain to the spectral content of the input to remove the spectral content that is due to echo. While echo suppression is described herein, the echo suppression gains described herein can be calculated to also suppress noise, and in the case of multiple inputs, e.g., from an array of two or more spatially separated microphones, can also be combined with a suppression gain for out-of-location signals. Furthermore, the suppression for noise can be spatially selective. The combining leads to combined suppression gain.

Example Echo Suppression

With Optional Noise Suppression

The signal processing is typically performed by processing frames of M samples, typically overlapping, e.g., with 50% overlap. The frames are also often called blocks. The processing is frame-by-frame. The inputs to the processing system and the processing method are: an input signal comprising input signal samples of a frame, denoted y(m), m=0, . . . , M−1, and an echo reference signal 118 as samples x(m), m= 0, . . . , M−1. The input signal is typically determined from one or more microphone signals. While FIG. 3A shows a simple example of one microphone which after amplification and conversion to digital, provides the input signal, the input signal may be determined from a plurality of microphone signals or other input signals that are mixed, e.g., beamformed, as would be known to those in the art. Similarly, while one reference signal is shown in FIG. 3A, those in the art will understand that there may be several output signals e.g., for a plurality of speakers that are available for reference signals. In the case of a plurality of reference signals, assume the reference signals are combined to provide a single echo reference signal, e.g., in the sample domain, i.e., signal x(m), e.g., by simple addition. Note arrangements other than simple addition are also possible, e.g., filters may be included on each of the speaker feeds before summing to create the reference signal, and the invention is not limited to any particular method of deriving the echo reference signal. Furthermore, while FIG. 3A shows the echo reference signal as being provided in digital form as the exact digital signal that is rendered by the loudspeaker, in an actual system, those in the art will understand that it is possible that the reference signal(s) are provided from loudspeaker outputs after rendering, e.g., from microphones picking up the loudspeaker outputs and digitizing such picked-up outputs, or the signals may be tapped in the analog domain. Furthermore, the combining in the case of multiple reference signals can be in the sample domain or in the frequency domain.

The input signal is buffered, windowed and transformed into the frequency domain into frequency bins by a time-to-frequency input transformer 301 respectively to generate a set of N complex frequency bins denoted $Y_n$, n=0, ..., N−1, and shown as signals 303. Note that in this description, index n is used to indicate a frequency bin. The method does not depend on the particular transform used, and one embodiment uses the Short-Time Fourier Transform (STFT). Other embodiments can use other transforms, such as the MDCT, DFT (implemented as an FFT), and so forth. For speech processing a typical buffer size would be 20 ms, or 320 samples at 16 kHz, leading to a transform size (N) of 512-points (taking the next highest power of two from the buffer size). Many appropriate window functions are known and can be used in the input transformer elements.

Note that when a plurality of input signals, e.g., microphone signals are used to determine the input signal, the multiple signals may be combined, e.g., beamformed in the sample domain, or in the frequency domain, and the invention is not limited to how such combining occurs.

The N frequency domain bins are then grouped into B spectral bands by a spectral banding element (a "spectral bander") 305 for $Y_n$. In one embodiment, the banding by each of 305 includes taking a weighted sum across the bin powers. That is, the b'th spectral band, e.g., of the microphone input microphone signal 303 is computed as a signal denoted $Y'_b$ and described by:

$$Y'_b = \sum_{n=0}^{N-1} w_{b,n} |Y_n|^2$$

where $w_{b,n}$ represents the n'th bin weight for the b'th spectral band, n=0, ..., N−1, and b=1, ..., B. Similarly, $$X'_b = \sum_{n=0}^{N-1} w_{b,n} |X'_n|^2.$$

Note that when a subscript b is used for a quantity, the quantity is banded in frequency band b. Note also that whenever a prime is used in the banded domain, this is a measure of subband power, or, in general, any metric of the amplitude. Thus, the prime notation can be generalized to any metric based on the frequency domain complex coefficients, in particular, their amplitude. In one alternate embodiment, the 1-norm is used, i.e., the amplitude (also called envelope) of the spectral band is used, and the expression for the instantaneous signal spectral amplitude becomes $$Y'_b = W_b \sum_{n=0}^{N-1} w_{b,n} |Y_n|.$$

In some embodiments, a useful metric is obtained by combining the weighted amplitudes across the bins used in a particular band, with exponent p, and then applying a further exponent of 1/q. We shall refer to this as a pq metric, and note that if p=q then this defines a norm on the vector of frequency domain coefficients. By virtue of the weighting matrix $w_{b,n}$, each band has a different metric. The expression for the instantaneous signal metric in each band becomes:

$$Y'_b = W_b \left( \sum_{n=0}^{N-1} w_{b,n} |Y_n|^p \right)^{\frac{1}{q}}.$$

While in embodiments described herein, the signal power and the signal power spectra are used, i.e., p=2, and q=1, the description, e.g., equations and definitions used herein can be readily modified to use any other pq metric, e.g., to use the amplitude, or some other metric of the amplitude, and how to carry out such modification would be straightforward to one having ordinary skill in the art. Therefore, while the terminology used herein might refer to "power" or to "power (or other frequency domain amplitude metric)," the equations typically are for power, and how to modify the equations and implementations to any other pq metric would be straightforward to one having ordinary skill in the art.

Further note that in the description herein, the explicit notation of the signal in the bin or banded domain may not always be included since it would be evident to one skilled in the art from the context. In general, a signal that is denoted by a prime and a subscript b is a banded frequency domain amplitude measure. Note also that the banding elements 305, 315 may be further optimized by combining gains and noting that the gain matrix is very sparse, and such a modification would be clear to those in the art, and is included in the scope of what is meant by banding herein.

In one embodiment, the bands are such that the frequency spacing of the bands is non-monotonically decreasing, and such that 90% or more of the bands have contribution from more than one frequency bin. In some embodiments, the band frequencies are monotonically increasing in a logarithmic-like manner, that is, the bands are spaced in an approximately logarithmically basis. We call this log-like. In some embodiments, the bands are on a psycho-acoustic scale, that is, the frequency bands are spaced with a scaling related to psycho-acoustic critical spacing, such banding called "perceptually-spaced" banding herein. In particular embodiments, the bands are spaced on such a perceptually motivated scale with an inter-band distance of approximately 1 Bark. This leads to a typical B of 30 for 16 kHz sampling rate. The advantages of operating in the perceptual band domain are:

Reduced computational complexity by estimating parameters on B bands, instead of N bins (generally B<<N).

The banding follows the critical bandwidth of the human auditory system. Thus any spectral modification will be performed in a manner appropriate for human perception.

Spectral estimates, e.g., of power are relatively accurate because a plurality of bins is included in each band (or in some embodiments, in at least 90% of the bands). Therefore, some embodiments need not include separate power spectrum estimate stabilizers such as element 307 (see below) or element 319 (see below).

The system 300 includes a reference signal path 310 to accept, in general one or more reference signals, and in the example shown, an echo reference signal (118) which in the case of a plurality of reference signals, represents the plurality reference signals. In the embodiment shown, the echo reference signal is buffered and windowed. The reference signal path includes a time-to-frequency transformer 311 to transform to a set of N complex frequency bins denoted $X_n$, respectively, $n=0, \ldots, N-1$, and shown as signals 313. The same transform as in 301 is used.

The reference signal path includes a frequency bander 315 to form a banded frequency-domain amplitude metric, e.g., power of the echo reference signal (118) representing the one or more reference signals. Using, e.g. in the case of power, $$X'_b = \sum_{n=0}^{N-1} w_{b,n} |X'_n|^2.$$

The reference signal path (310) includes a nonlinear element 331, 333, and/or 335 of FIGS. 3B, 3C, and/or 3D, respectively, such that the banded frequency-domain amplitude metric is of a nonlinearly distorted version of the one or more reference signals.

The goal is suppress echo(es) from the input signal. One way is to determine gains to apply to the input signal, e.g., to $Y_n$ in order to suppress echoes. The inventors have observed that smooth gain curves sound better. As a result of the perceptual banding, the resulting gain curve is smoother than if it had been calculated on individual bins. This limits the amount of musical artifacts produced by embodiments of the invention.

The echo reference signal is passed through adaptive linear filter (317)—a band domain linear block adaptive filter 317 with a number of taps, denoted L that uses a set of L adaptively determined filter coefficients. The output, denoted $E'_b$ represents the estimated echo power (or other metric of the amplitude) for the current frame of audio.

$$E'_b = \sum_{l=0}^{L-1} F_{b,l} X'_{b,l},$$

where $F_{b,l}$ is the b'th of a set of B filter coefficients, $b=1, \ldots, B$, for the l'th time lag, with $l=0$ representing the present frame, and $X'_{b,l}$ is b'th of a set of B echo reference powers for the l'th time lag, with $l=0$ representing no lag, i.e., the present frame of samples. A typical value of L for a 20 ms frame size is 10 providing a temporal window of 200 ms for estimating the echo response. The adaptive filter thus uses a set of adaptively determined filter coefficients.

In one embodiment, the output of the adaptive filter is time smoothed in echo power estimate stabilizer 319 to form an estimate of the echo power spectrum (or other amplitude metric spectrum), denoted $\overline{E}'_b$ that is smoother than that output by the adaptive filter. In one embodiment, a first order time smoothing filter is used as follows:

$$\overline{E}'_b = E'_b \text{ for } E'_b \geq E'_{b_{Prev}}, \text{ and}$$

$$\overline{E}'_b = \alpha_{E,b} E'_b + (1-\alpha_{E,b}) E'_{b_{Prev}} \text{ for } E'_b < E'_{b_{Prev}}$$

where $E'_{b_{Prev}}$ is the previously determined echo spectral estimate, e.g., in the most recently, or other previously determined estimate, and $\alpha_{E,b}$ is a first order smoothing time constant. The time constant in one embodiment is not frequency-band-dependent, and in other embodiments is frequency-band-dependent. Any value between 0 and 200 ms could work. A suggestion for such time constants ranges from 0 to 200 ms and in one embodiment the inventors used values of 15 to 200 ms as a frequency-dependent time constant embodiments, whilst in another a non-frequency-dependent value of 30 ms was used. One embodiment used a value of 0.5 for $\alpha_{E,b}$ for a 20 ms buffer size.

Note that one advantage of having accurate perceptual banding is that perceptually banded "instantaneous" powers more accurately reflect actual power spectra than frequency bin domain instantaneous power. Hence, in some embodiments, echo power estimator is not included, and in the formulae below, $E'_b$ is used in place of $\overline{E}'_b$.

The coefficients of the filter 317 are updated by a filter coefficient updater 318. In one example implementation, the coefficient updater 318 updates the coefficients using a normalized least mean squares (NLMS) method, in particular:

$$F_{b,l} = F_{b,l}\bigg|_{Prev} + \mu \frac{(Y'_b - E'_b) X'_{b,l}}{\sum_{l'=0}^{L-1}(X'^2_{b,l'} + X'^2_{sens})},$$

where $\mu$ is a tuning parameter that affects the rate of convergence and stability of the echo estimate. Values between 0 and 1 might be useful in different embodiments. In one embodiment, $\mu=0.1$. $X'_{sens}$ is set to avoid unstable adaptation for small reference signals. In one embodiment $X'_{sens}$ is related to the threshold of hearing. In another embodiment, $X'_{sens}$ is a pre-selected number of dB lower than the reference signal, so is set relative to the expected power (or other frequency domain amplitude metric) of the reference signal, e.g., 30 to 60 dB below the expected power (or other frequency domain amplitude metric) of $X'_b$ in the reference signal. In one embodiment, it is 30 dB below the expected power (or other frequency domain amplitude metric) in the reference signal. In one embodiment, a value of −85 dB is used for $X'_{sens}$. In other embodiments, a value in the range −100 dB to −40 dB is used.

Note that other methods of updating filter coefficients are known, and the invention is not limited to using the NLMS method.

In situations when both local and remote talkers are active, the filter adaption should be paused to stop the filter from suppressing the local talker. One embodiment of the coefficient updater 318 includes a double talk detector to gate adaptation of the filter gains. The invention is not limited to any particular double talk detector, and in one embodiment, a control signal denoted S is formed from an estimate total signal power above the current echo estimate, compared to a threshold, and the result used as a control signal.

$$S = \sum_{b=1}^{B} \frac{\max(0, Y'_b - \beta_E \overline{E}'_b)}{Y'_b + Y'_{sens}},$$

where the parameter $\beta_E > 1$ is an over subtraction factor to control the aggressiveness of the echo suppression for the purpose of double talk detection (typical value of 2 or 6 dB), and the parameter $Y'_{sens}$ controls the sensitivity of the detector. $Y'_{sens}$ is set to be around expected microphone and system noise level, obtained by experiments on typical components. Alternatively, one can use the threshold of hearing to determine a value for $Y'_{sens}$, or set a re-determined value. In one embodiment, $Y'_{sense}$ is set to −45 dB). Measure S is a measure of transient or short time signal flux above the expected echo.

Double talk is detected by the detector in updater 318 to determine whether or not to update the prediction filter coefficients in the echo prediction filter coefficient adapter. This is determined by a threshold, denoted $S_{thresh}$ in the value of S. The choice of value for $S_{thresh}$ depends on the number of bands. $S_{thresh}$ is between 1 and B. In one embodiment having 24 bands to 8 kHz, a suitable range for $S_{thresh}$ was found to be between 2 and 8, with a particular embodiment using a value of 4.

Note that alternate embodiments include noise suppression. In such embodiments, a noise estimator of the noise power spectrum (or other metric of the noise amplitude) is included. The noise estimator is shown as element 327 in FIG. 3A in broken lines to indicate it is an optional element. Not all connections to it and from it are shown.

The noise power spectrum (or other amplitude metric spectrum) denoted $N'_b$ is estimated as the component of the signal which is relatively stationary or slowly varying over time. Different embodiments can use different noise estimation methods, and the inventors have found a leaky minimum follower to be particularly effective.

In one embodiment, a simple minimum follower based on a historical window can be improved. The estimate from such a simple minimum follower can jump suddenly as extreme values of the power enter and exit the historical window. The simple minimum follower approach also consumes significant memory for the historical values of signal power in each band. Rather than having the minimum value be over a window, some embodiments of the present invention use a "leaky" minimum follower with a tracking rate defined by at least one minimum follower leak rate parameter. In one embodiment, the "leaky" minimum follower has exponential tracking defined by one minimum follower rate parameter.

Denote the previous estimate of the noise spectrum $N'_b$ by $N'_{b_{Prev}}$. In one embodiment, the noise spectral estimate is determined, e.g., by element 123, and in step 221 by a minimum follower method with exponential growth. In order to avoid possible bias, the minimum follower is gated by the presence of echo comparable to or greater than the previous noise estimate.

In one embodiment, a gated minimum follower is used for the noise estimate:

$N'_b = \min(P'_b(1+\alpha_{N,b})N'_{b_{Prev}})$ when $E'_b$ is less than $N'_{b_{Prev}}$ $N'_b = N'_{b_{Prev}}$ otherwise, where $\alpha_{N,b}$ is a parameter that specifies the rate over time at which the minimum follower can increase to track any increase in the noise. In one embodiment, the criterion $E'_b$ is less than $N'_{b_{Prev}}$ is if $E'_b < N'_{b\ Prev}/2$, i.e., in the case that the (smoothed) echo spectral estimate $E'_b$ is less than the previous value of $N'_b$ less 3 dB, in which case the noise estimate follows the growth or current power. Otherwise, $N'_b = N'_{b_{Prev}}$, i.e., $N'_b$ is held at the previous value of $N'_b$.

The parameter $\alpha_{N,b}$ is best expressed in terms of the rate over time at which minimum follower will track. That rate can be expressed in dB/sec, which then provides a mechanism for determining the value of $\alpha_{N,b}$. The range is 1 to 30 dB/sec. In one embodiment, a value of 20 dB/sec is used.

For embodiments that include noise suppression, for double talk detection, $$S = \sum_{b=1}^{B} \frac{\max(0, Y'_b - \beta_E \overline{E}'_b - \beta_N N'_b)}{Y'_b + Y'_{sens}},$$

where the parameter $\beta_N > 1$ is an additional subtraction factor to control the aggressiveness of the echo suppression for the purpose of double talk detection, with a typical value of 2 or 6 dB.

One embodiment includes a power estimate stabilizer 307 forming an estimate of the banded microphone power spectrum (or spectrum of some other metric of the amplitude), denoted $P'_b$. The inventors have found that in one embodiment, the instantaneous microphone power, $Y'_b$ is a sufficiently good estimate. For such embodiments, the power estimate stabilizer 307 is not used, and wherever the term $P'_b$ is used, $Y'_b$ can be substituted therefor. In another embodiment, power estimate stabilizer 307 includes the stabilizing the power estimate $Y'_b$ by smoothing with a first order IIR filter in 307 with rate defined by the constant $\alpha_{P,b}$:

$P'_b = \alpha_{P,b}(Y'_b + Y'_{min}) + (1-\alpha_{P,b})P'_{b_{PREV}}$ wherein where $P'_{b_{PREV}}$ is a previously, e.g., the most recently determined signal power (or other frequency domain amplitude metric) estimate, $\alpha_{P,b}$ is a time signal estimate time constant, and $Y'_{min}$ is an offset added to avoid a zero level power spectrum (or other amplitude metric spectrum) estimate. Alternate embodiments use a different smoothing method, and may not include the offset. A suitable range for the signal estimate time constant $\alpha_{P,b}$ was found to be between 20 to 200 ms. A value of 0.7 was used for a 20 ms buffer size. $Y'_{min}$ can be measured, or can be selected based on a priori knowledge. $Y'_{min}$, for example, can be related to the threshold of hearing or the device noise threshold.

For just echo suppression, a gain calculator 321 calculates the per-band suppression gains based on the smoothed microphone power ($P'_b$, or in some embodiments, $Y'_b$) and the smoothed echo power estimate ($E'_b$).

$$G'_b = \min\left(G_{min}, \frac{\max(0, P'_b - \gamma_E \overline{E}'_b)}{P'_b}\right)^2$$

The parameter $\gamma_E$ is an over subtraction factor to control the aggressiveness of the echo suppression, and a typical value of 3 dB is used. In general, a range of 1 to 4 is used. Parameter $G_{min}$ defines a minimum attenuation that will be applied to each band, with a typical value of −60 dB. This minimum value is not meant to be limiting, and can be different in different embodiments. The inventors suggest a range of from 0.001 to 0.3 (−60 dB to −10 dB), and the minimum can be frequency dependent.

When simultaneous noise suppression is included, the gain calculator includes the noise power (or other noise amplitude metric):

$$G'_b = \min\left(G_{min}, \frac{\max(0, P'_b - \gamma_N N'_{b,S} - \gamma_E \overline{E}'_b)}{Y'_b}\right)^2,$$

where $\gamma_N$ is a scaling parameter in the range of 1 to 4, with a typical value of 3 dB.

Recall that in some embodiments, $Y'_b$ can be used in place of $P'_b$.

A gain applicator 323 applies the gain to the input signal to produce an echo-suppressed output signal. In one embodiment of gain applicator 323, the B banded gains $G'_b$ are interpolated to produce a set of N frequency bin gains denoted $G_n$, n=0, 1, ..., N−1 by inverting the mix matrix used to form the bands. Gain applicator 323 includes multiplying the complex frequency bin microphone inputs $Y_n$ by these gains $G_n$ to produce echo-suppressed frequency bin output. In one embodiment, a synthesis inverse transformer 325 produces echo-suppressed time domain output, e.g., by a standard overlap-add and inverse transform process. In another embodiment, element 325 remaps the echo-suppressed frequency bin output to produce remapped echo-suppressed output for further processing in the frequency domain, e.g., for audio coding. In yet another embodiment, element 325 includes a synthesis inverse transformer and a remapper to produce both time domain and remapped frequency domain data.

Elements 321 and 323 are in combination an echo suppressor element to form an echo-suppressed output signal. While in the embodiment shown, the echo suppressor element includes the gain determination and application as shown in FIG. 3A, in other embodiments, these operations are combined into an echo suppressing operation, therefore, the invention is not limited to the gain determination and the gain applying.

Unlike traditional echo cancellation in which a filtered echo reference signal is directly subtracted from the microphone signal, so that if the echo reference signal were to be corrupted in any way, e.g., by nonlinearities in the system, or by inaccurately modeling nonlinearities in the system, the echo cancellation would not be successful and the mismatch would leak through the system, in embodiments of the present invention, distortion components, e.g., from one or more nonlinear elements, are intentionally added to the echo reference signal path 310 in order to enable the adaptive filter to lock to distortion components that are present in the microphone signal due to nonlinearities in the feedback system.

Thus, embodiments of the invention include a nonlinear element in the reference signal path 310. In one embodiment, the nonlinear element is a time-domain nonlinearity acting on the reference signal samples x(m). In other embodiments, the nonlinear element is applied in the frequency-domain.

Method Embodiments

Figure 4:
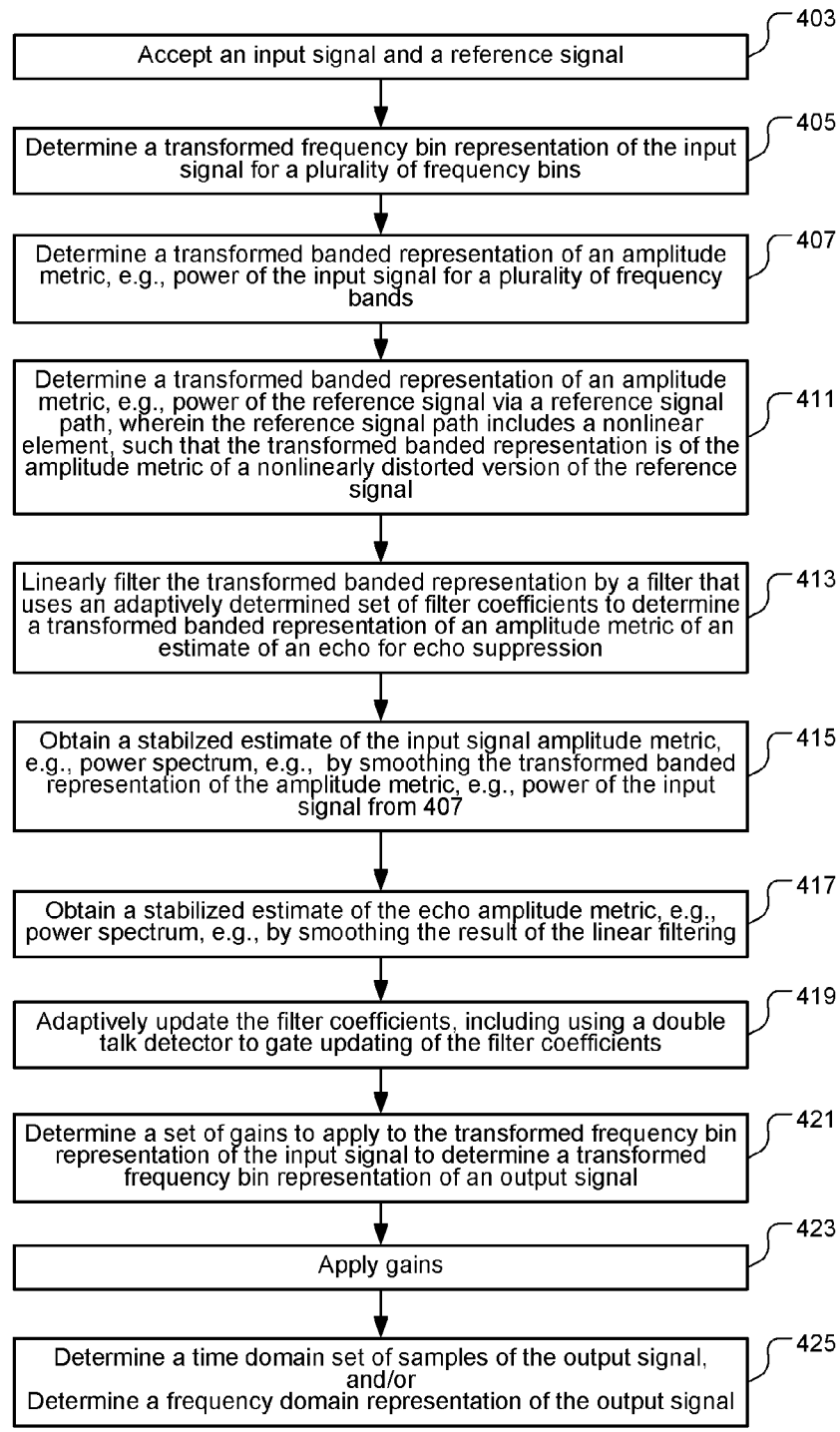
FIG. 4 shows a simplified flowchart of a method embodiment of the invention.

FIG. 4 shows a simplified flowchart of a method embodiment 400 of the invention. The method 400 includes in 403 accepting an input signal and an echo reference signal. The input signal is typically from one or more microphones, so is, e.g., a signal representative of one or more microphone input signals that have been sampled and buffered. The echo reference signal may be, e.g., representative of one or more loudspeaker signals. The method further includes in 405 determining a transformed frequency bin representation of the input signal for a plurality of frequency bins, and in 407 determining a transformed banded representation of an amplitude metric of the input signal for a plurality of spectral bands, with at least the spacing non-monotonic decreasing, and with 90% of the spectral bands including more than one frequency bin. In particular embodiments, the band spacing is log-like, i.e., on an approximately logarithmic basis. In some embodiments, the band spacing is on a perceptually motivated scale. The amplitude metric is in one embodiment the power. The method further includes in 411 determining a transformed banded representation of an amplitude metric of the reference signal via a reference signal path, wherein the reference signal path 310 includes a nonlinear element, such that the transformed banded representation is of the amplitude metric of a nonlinearly distorted version of the reference signal. The processing in the reference signal path includes time-to-frequency transforming and banding. The method further includes in 413 linearly filtering the transformed banded representation by a filter that uses an adaptively determined set of filter coefficients, the filtering to determine a transformed banded representation of an amplitude metric of an estimate of an echo for suppression. The method further includes in 419 adaptively determining the filter coefficients using the banded representation of the amplitude metric of an estimate of an echo and the banded representation of the amplitude metric of the input signal.

The method further includes suppressing echoes by processing the input signal according to the banded representation of the amplitude metric of an estimate of an echo and the banded representation of the amplitude metric of the input signal. In some embodiments, the suppressing includes in 421 determining a set of gains to apply to the transformed frequency bin representation of the input signal to determine a transformed frequency bin representation of an output signal. The method includes applying the gains. The method includes in 423 applying the gains. The gains are in one embodiment determined in the banded domain, and interpolated to be applied in the bin domain. In another embodiment, the gains are applied in the banded domain, and the interpolation is after the gains are applied.

In some embodiments, the method further includes in 425 determining a time domain set of samples of the output signal, while in another embodiment, the method further (or in addition) includes in 425 determining a frequency domain representation of the output signal, e.g. for coding or some other further frequency domain processing.

In one embodiment, the adaptively determining the filter coefficients of 419 is gated by a double talk detector.

In some embodiments, the method further includes determining in 415 a stabilized estimate of the amplitude metric spectrum of the input signal, e.g., by smoothing the transformed banded representation of the amplitude metric of the input signal from 407. In some embodiments, the method further includes determining in 417 a stabilized estimate of the amplitude metric spectrum of the echo to use for the determining of the set of gains, e.g., by smoothing the result of the linear filtering.

In some embodiments, 421, determining the set of gains to apply to the transformed frequency bin representation of the input signal includes determining a set of banded gains, and interpolating the set of banded gains to a set of frequency bin gains.

Some method embodiments include simultaneous noise suppression. Such embodiments include determining a banded spectral estimate of the noise amplitude metric, e.g., power spectrum to use for the suppression, e.g., for determining the set of gains, and in some embodiments, to use for double talk suppression.

In some embodiments, the nonlinearity in the reference signal path is in the time-sample (m) domain before the reference signal is transformed. In other embodiments, the nonlinearity in the reference signal path is in the frequency domain.

Some Nonlinearity Embodiments in More Detail

Referring to FIG. 3A, in one embodiment, the nonlinearity is placed at location 1. FIG. 3B shows such a nonlinearity as element 331. In general, denote the time domain distorted reference signal by $x(m)|_D$. Denote the time domain nonlinearity of element 331 by a nonlinear memory-less function $f(\cdot)$. Then $$x(m)|_D = f(x(m)).$$

Note that the invention is not limited to a memory-less function. However, for simplicity, using a memory-less function is described herein. How to extend to functions with memory would be straightforward to those in the art.

In one embodiment, the time domain distorted reference signal, denoted $x(m)|_D$ is a polynomial function of the input, e.g., a P'th order polynomial function of the input $x(m)$, e.g., $$x(m)|_D = \sum_{p=0}^{P} a_p x^p(m),$$

where the $a_i$, $i=1, P$ are constants.

Typically, $a_0=0$ so that the polynomial has no offset term. That is, $$x(m)|_D = \sum_{p=0}^{P} a_p x^p(m)$$

In one embodiment, the nonlinearity is a third order polynomial, i.e., $P=3$, and, in one example, $a_1=a_2=a_3=1$ so that $$x(m)|_D = x^3(m) + x^2(m) + x(m).$$

Such a polynomial will add odd harmonics, which is typical for many of the devices found in hands-free telephones, and in Bluetooth headsets. In another embodiment, to add even harmonics, a small offset is added. That is, $a_0 \neq 0$, say is a small offset $\delta$, so that $$x(m)|_D = \delta + \sum_{p=1}^{P} a_p x^p(m),$$

where $\delta$ is small offset, e.g., in the case of $P=3$, and $a_0=0$, $a_1=a_2=a_3=1$, $\delta$ is between 0.001 and 0.1.

In another embodiment, $f(\cdot)$ is a piece-wise linear function. In one particular example, $f(\cdot)$ is a simple clipping function.

$$x(m)|_D = \begin{cases} -x_M & x(m) < -1 \\ x(m) & -1 \leq x(m) < 1 \\ x_M & x(m) \geq 1, \end{cases}$$

where $x_M$ is the saturation level. In a typical hands-free telephone system, the non-linear response might be approximated by some soft-clipping before hard-clipping/saturation. The polynomial example is a rough approximation, with no clipping. The simple clipping function, of course is clipping. One can combine the polynomial with the simple clipping. That is, use $$x(m)|_D = \begin{cases} -x_M & x(m) < -1 \\ x^3(m) + x^2(m) + x(m) & -1 \leq x(m) < 1 \\ x_M & x(m) \geq 1, \end{cases}$$

where $x_M$ is the output level limit.

In another embodiment, $f(\cdot)$ is a soft clipping function, e.g., $$x(m)|_D = \frac{x_M x(m)}{\sqrt[\alpha]{|x_M|^\alpha + |x(m)|^\alpha}}$$

where $\alpha$ is a tuning parameter. In one embodiment, $\alpha=2$.

Yet another embodiment uses a soft clipping function defined by $$x(m)|_D = \begin{cases} x(m) & |x(m)| \leq \alpha \\ \operatorname{sgn}(x(m)) \left[ \frac{0.25}{\alpha - x_M}(|x(m)| - 2x_M + \alpha)^2 + x_M \right] & \text{otherwise} \\ \operatorname{sgn}(x(m))x_M & |x(m)| > \gamma, \end{cases}$$

where $\alpha$ is a tuning parameter the defines the clipping start level, and $\gamma$ is a parameter indicating the soft clipping stop level. Typical values are $x_M=1$, $\alpha=0.7$, and $\gamma=1.3$, so that the soft transition occurs in the regions $0.7 < |x(m)| \leq 1.3$.

One feature of the present invention is that there is no need to accurately fit the parameter $x_M$, or the other parameters, or, for example, to accurately model the shape of a soft clipping. For example, either of the two version of a soft clipping would work.

These functions are just examples. The invention is not limited to any of these classes of functions. The closer the inserted nonlinearity is to the system nonlinearity, the faster convergence will be of the filter coefficients. However, unlike the case with prior art echo cancellers, there is no need for accuracy to achieve echo suppression.

In another embodiment, characteristics of typical devices, such as speakers and microphones are measured, and an average characteristic is used for a "typical" set of components. Again, a feature of the invention is that the performance is tolerant of the nonlinearity inserted not being an accurate model of the actual nonlinear characteristics of the hardware, e.g., the speaker(s), microphone(s), and room feedback path.

While the system is tolerant of errors in the modeling, and therefore no training and parameter estimation, also called system identification, is required on the nonlinearity inserted, another set of embodiments includes inserting a nonlinearity that includes parameters, and determining the parameters by experimentation and parameter fitting, i.e., includes fitting parameters to the nonlinearity based on measurements on an actual system, or on a prototypical sample instantiation of the system in which instantiations of the invention will be operating. For example, in an embodiment in which the nonlinearity is a polynomial with offset, e.g., $$x(m)|_D = \delta + \sum_{p=0}^{P} a_p x^p(m),$$

experiments were run to determine suitable values of $\delta$ and the $a_p$.

Again, one important feature is that the nonlinearity need not be an accurate model of the actual nonlinearity. This is in contrast with echo cancellation solutions which require relatively accurate modeling, and this requires training and/or parameter fitting.

Example Performance

The inventors conducted an experiment on the laptop system used to determine the results of FIG. 2. A unit amplitude 300 Hz sinusoid amplitude modulated at 4 Hz was input into both the microphone feed and speaker feed of the system, with 24 ms frames sampled at a 16 kHz sampling rate. No distortion was introduced in the microphone path. The microphone feed was delayed by 1000 samples relative to the echo reference feed. The modulation was provided to give the echo suppressor timing information to adapt towards, since otherwise, a simple sinusoidal input would be highly self-correlated.

In a first experiment, a non-linearity is inserted at position 1 of FIG. 3A with the following definition. In the first experiment, no nonlinearity was included in the microphone path. The nonlinearity was:

$$x(m)|_D = x^3(m) + x^2(m) + x(m).$$

Figure 5:
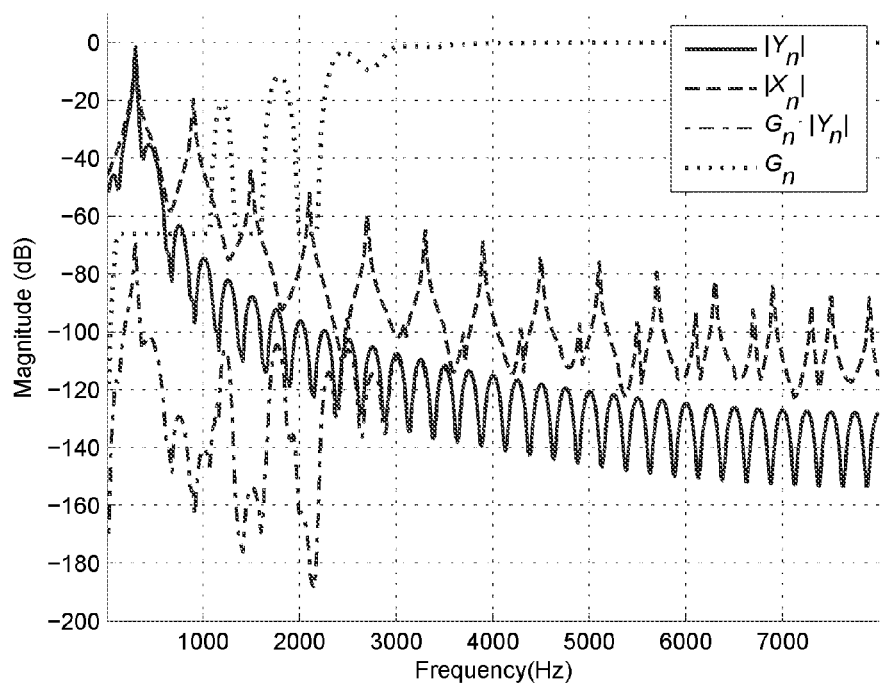
FIG. 5 shows a frequency domain magnitude response of the system of FIG. 3A modified as in FIG. 3B with a simple polynomial nonlinearity to a simple modulated sinusoidal signal, with the physical system simulated as not having a nonlinearity.

FIG. 5 shows the frequency domain magnitude response, in dB, of the system of FIG. 3A modified as in FIG. 3B to this input. The reference feed clearly shows the harmonic distortion present due to the nonlinear function. In this case the adapted gain function has acted to remove the energy due to the fundamental frequency of the sinusoid only since there is no significant energy in the microphone feed above this frequency.

Figure 6:
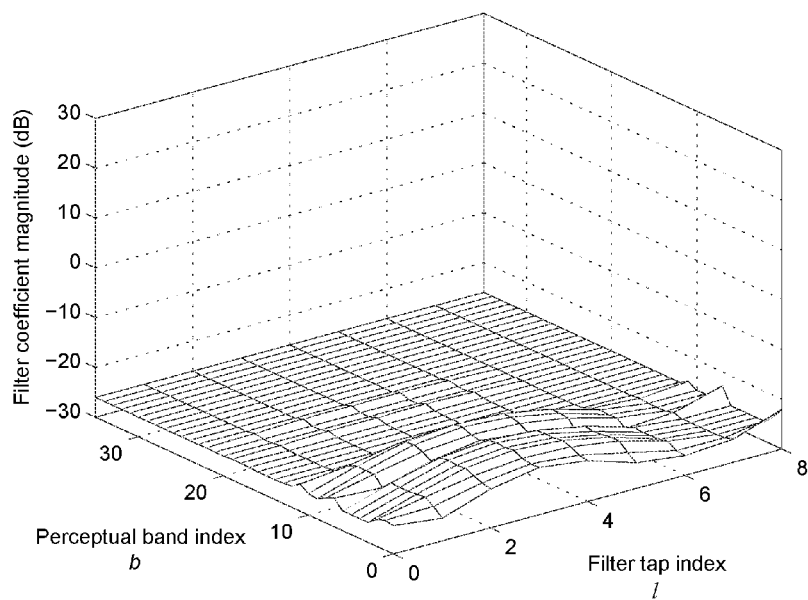
FIG. 6 depicts the magnitude of the adapted filter coefficients for the simple example of FIG. 5.

FIG. 6 depicts the magnitude in dB of the adapted filter coefficients ($F_{b,l}$) for this simple example. The filter levels have been truncated at −30 dB. The centroid of the filter is at around 4 taps, i.e., four frames, or 96 ms, corresponding approximately to the 1000 sample lead in the echo reference. The magnitude of the filter coefficients indicates the energy to be removed is concentrated in the first 10 perceptual bands. Note that the nonlinear function $x^3(m)+x^2(m)+x(m)$ is adding energy to the reference feed thus the filter coefficients are applying attenuation to match the microphone level.

Figure 7:
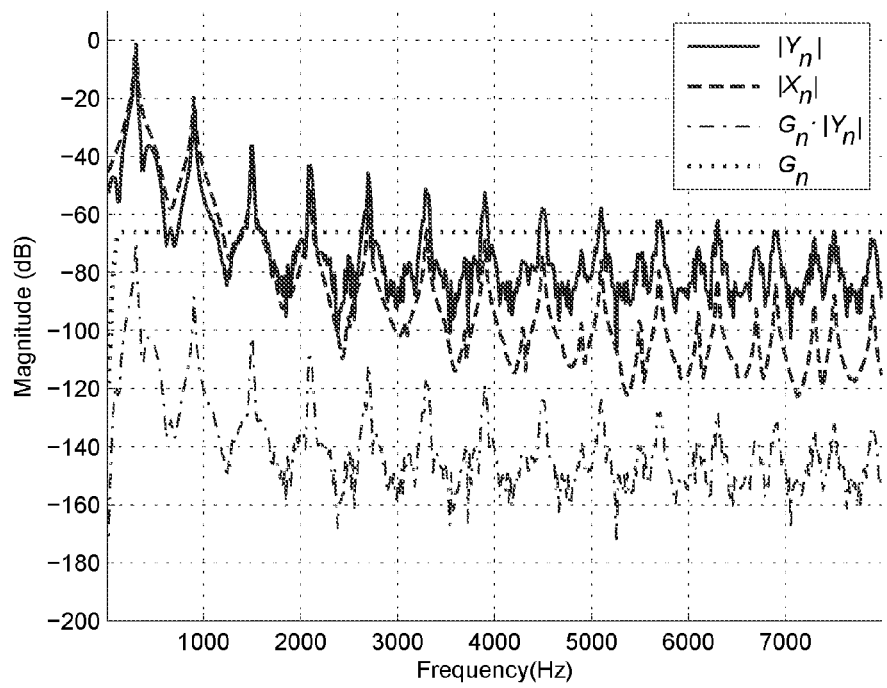
FIG. 7 shows a frequency domain magnitude response of the system of FIG. 3A modified as in FIG. 3B with a simple polynomial nonlinearity to a simple modulated sinusoidal signal, with the physical system simulated as having a loudspeaker that saturates.

The same test configuration was repeated with the same nonlinearity $x^3(m)+x^2(m)+x(m)$, but with the microphone signal path including saturation at an amplitude of 0.7 to simulate an actual microphone. FIG. 7 shows the frequency domain magnitude response, in dB, of the system of FIG. 3A modified as in FIG. 3B to this input with saturation in the microphone. In this case, the microphone amplitude response indicates the significant level of distortion, the characteristic of which is different to that on the reference input due to the different nonlinear functions used on the two paths. Once again, the gain function has acted to remove all of the echo energy, this time removing energy across the full spectrum to the distortion components.

Figure 8:
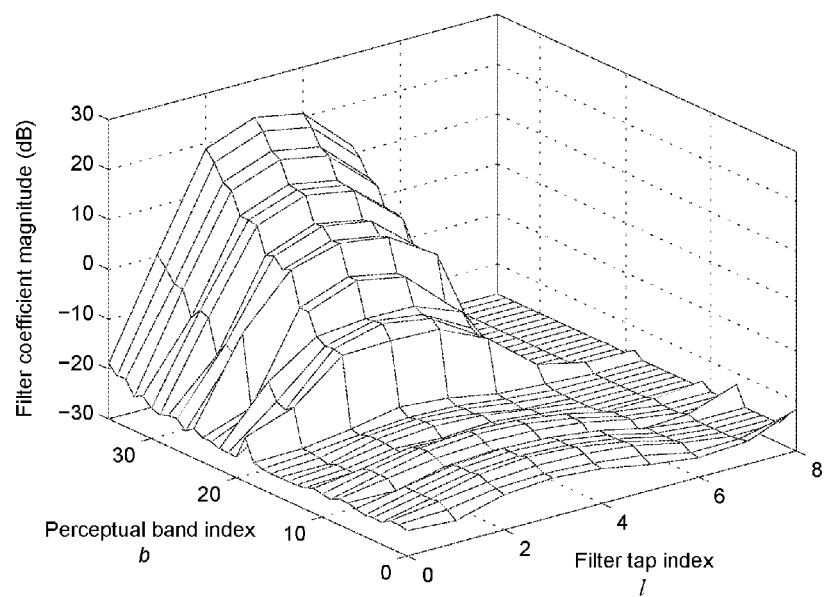
FIG. 8 depicts the magnitude of the adapted filter coefficients for the example of FIG. 7.

FIG. 8 depicts the magnitude in dB of the adapted filter coefficients ($F_{b,l}$) for this example with saturation in the microphone signal path. Again, the filter levels have been truncated at −30 dB. The filter has once again applied a small amount of tuning to the lower 10-15 spectral bands to match the microphone and reference feeds. The higher spectral bands show significant gain to adjust for the mismatch between microphone and reference nonlinearities. This demonstrates the ability of the echo suppressor to adjust for mismatch between the actual nonlinearities in the microphone path—a saturation—with the simple polynomial nonlinear function introduced in one embodiment in the reference signal path.

In one embodiment, the nonlinearity introduced is designed to introduce power in the appropriate spectral bands. In such a case, the adaptive filter acts to match the energy.

It would be apparent to one skilled in the art that there is a large class of nonlinear functions that could be used in place of the aforementioned function.

Another simple example of including a low complexity nonlinearity is to introduce the nonlinearity in the frequency domain. In one set of embodiments, the nonlinearity bin domain is introduced at location 2 of FIG. 3A, as shown in FIG. 3C. The linear spacing of the frequency bins means that harmonic components based on a fundamental located in a particular bin, say a bin denoted by $n_0$ would be located in bins $2n_0$, $3n_0$, and so forth. In one embodiment, the nonlinearity distributes power from one or more fundamental components to higher order components in the frequency bin domain, the distribution from a first component to the next higher component being according to an attenuation factor. One embodiment includes taking the power from a first bin, say bin $n_0$, attenuating the power from the first bin $n_0$ according to the attenuation factor, and adding the resultant power to a next integer multiple of the first bin, e.g., $2n_0$ or $3n_0$, defined by a hop size. The process is continued by adding an attenuated amount of what was added to the next integer multiple. Using this technique, one embodiment adds nonlinear elements to only the odd harmonics, a second embodiment adds nonlinear elements to only the even harmonics, and yet a third embodiment adds nonlinear components to both the odd harmonics and even harmonics, with different attenuation factors for the odd harmonics and the even harmonics. In such embodiments, the amount of nonlinearity can be adjusted by adjusting the attenuation factors.

Figure 9A:
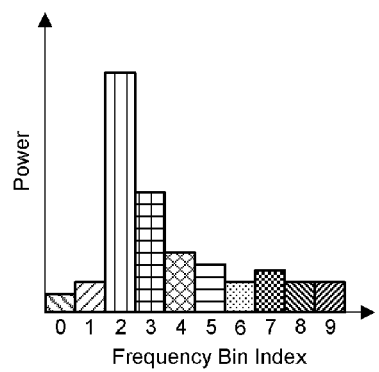
FIGS. 9A-9D show by way of a simple example a method of introducing nonlinearities in the reference signal path at a frequency bin domain part of the reference signal path for a transform. Only the first ten frequency bins are shown.
Figure 9B:
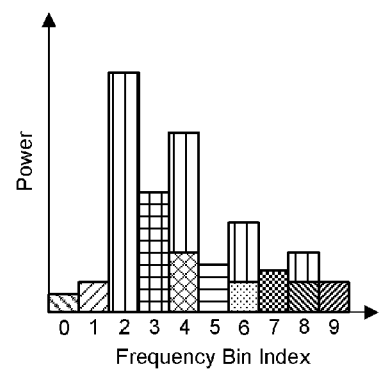
Figure 9C:
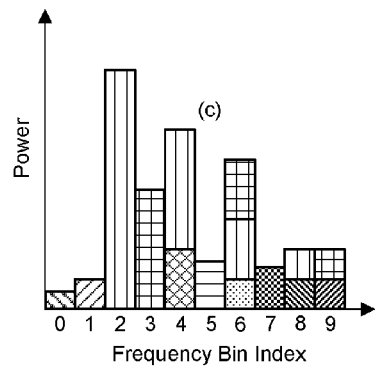
Figure 9D:
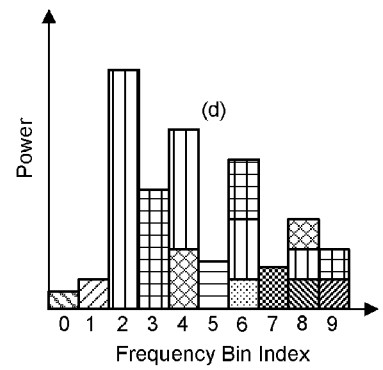

FIGS. 9A-9D show by way of a simple example a method of introducing nonlinearities in the reference signal path 310 at a frequency bin domain that is part of the reference signal path 310 for a transform with only the first ten frequency bins shown. FIG. 9A shows the first ten bins of the original echo reference power spectrum with each bin shown having a different fill. FIG. 9B shows a method of introducing nonlinearities from bin 2, with an attenuation factor of 50%, so adding half of the power level in bin 2 to bin 4, adding a half of what was added in bin 4, i.e., a quarter of the power level in bin 2 to bin 6, continuing the process to bin 8 which has one eighth of the power level of bin 2 added to it, and so forth. FIG. 9C further includes adding half of the power level in bin 3 to bin 6, adding half of the amount added to bin 6 to bin 9, and so forth. FIG. 9D further includes adding half of the power level of bin 4 to bin 8, and so forth. The result shown in FIG. 9D is the first ten bins of a spectrum with a power profile having harmonic power in keeping with a distorted version of the original spectrum.

This simple method can be modified in a number of ways for different embodiments of the invention. In one example, the hop size is changed. In another example, the attenuation factor is changed. In yet another example, both the hop size and the attenuation are changed. The method is fundamentally the same; the method includes adding to a second bin a multiple of a first frequency bin an attenuated amount of the power level of the first frequency bin according to an attenuation factor, and continuing the process by adding to a third frequency bin that is the next multiple of the first frequency bin an attenuated amount of the amount added to the second frequency bin.

In yet another example, an attenuation function is used to control the amount of fundamental power replication for both odd and even harmonics.

One version includes replicating $3^{rd}$ harmonics only with an attenuation factor of 20 dB, that is, attenuating the harmonic power by 20 dB for each replication.

The fundamental requirement for all variations of the method is that the introduced nonlinearity adds power to the spectrum that allows the adaptive filter to adapt towards the added nonlinearity. In general, the inventors have found that adding odd harmonics in this manner at location 2 of the system embodiment of FIG. 3A, e.g., as shown in FIG. 3C, enables the filter coefficients of the adaptive filter 317 to adapt to achieve echo suppression for typical nonlinearities present in typical physical systems. No accuracy is needed in the modeling of the nonlinearities.

Yet another embodiment of the invention includes adding the nonlinearity in the banded domain in location 3 of FIG. 3A, e.g., as shown in FIG. 3D. The inventors found, however, that is it easier to add nonlinearities in the frequency domain through distributing power from the fundamental components to higher order components by distributing power in the bin domain because each bin is linearly spaced in frequency. The banded domain may provide less accuracy in adding higher order harmonics as one may be less certain of the fundamental frequency, depending on bandwidth. Nevertheless, the invention is not limited to adding nonlinearities in the time domain or frequency bin domain segment(s) of the reference signal path, and may be added in the banded domain.

While the above embodiments include one or more memory-less nonlinearities, other embodiments include adding nonlinearities with memory. On one example, the one applicable to the method of distributing power from the fundamental components to higher order components, the amount of power distributed is decayed over time.

A Processing Apparatus Including a Processing System

Figure 10:
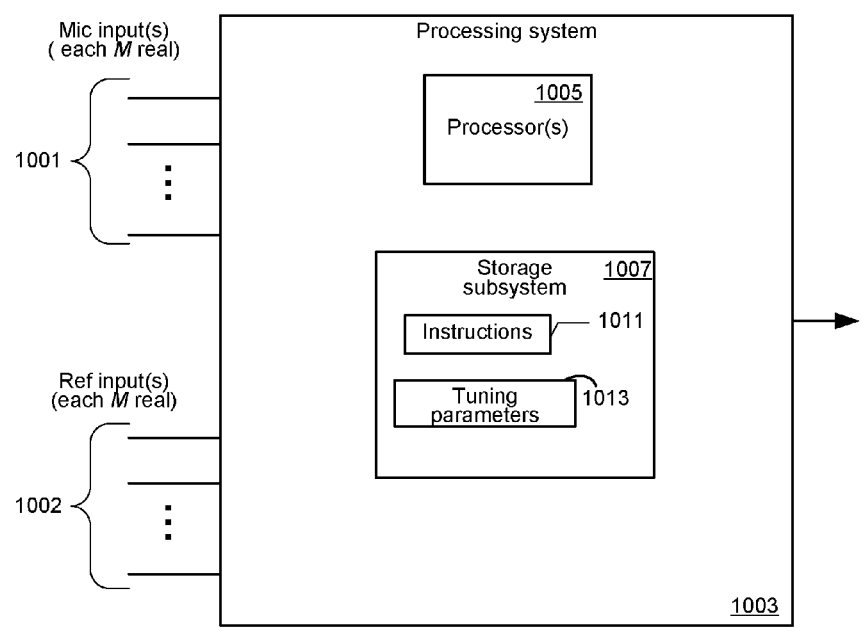
FIG. 10 shows a simplified block diagram of one processing apparatus embodiment 1000 for processing one or more audio inputs 1001, e.g., from one or more microphones (not shown) and one or more reference signals 1002, e.g., from one or more loudspeakers (not shown) or from the feed(s) to such loudspeaker(s).

FIG. 10 shows a simplified block diagram of one processing apparatus embodiment 1000 for processing one or more audio inputs 1001, e.g., from one or more microphones (not shown) and one or more reference signals 1002, e.g., from one or more loudspeakers (not shown) or from the feed(s) to such loudspeaker(s). The processing apparatus 1000 is to generate audio output that has been modified by suppressing, in one embodiment, echoes, and in another embodiment also noise as specified in accordance to one or more features of the present invention. The apparatus, for example, can implement the system shown in FIG. 3A, and any alternates thereof, and can carry out, when operating, the method of FIG. 4 including any variations of the method described herein. Such an apparatus may be included, for example, in a headphone set such as a Bluetooth headset, or in a laptop computer. The audio inputs 1001, the reference input(s) 1002 and the audio output are assumed to be in the form of frames of M samples of sampled data using standard overlapping frames, e.g., with 50% overlap. In the case of analog input, a digitizer including an analog-to-digital converter and quantizer would be present. For audio playback, a de-quantizer and a digital-to-analog converter would be present. Such and other elements that might be included in a complete audio processing system, e.g., a headset device are left out, and how to include such elements would be clear to one skilled in the art. The embodiment shown in FIG. 10 includes a processing system 1003 that is configured in operation to carry out the suppression methods described herein. The processing system 1003 includes at least one processor 1005, which can be the processing unit(s) of a digital signal processing device, or a CPU of a more general purpose processing device. The processing system 1003 also includes a storage subsystem 1007 typically including one or more memory elements. The elements of the processing system are coupled, e.g., by a bus subsystem or some other interconnection mechanism not shown in FIG. 10. Some of the elements of processing system 1003 may be integrated into a single circuit, using techniques commonly known to one skilled in the art.

The storage subsystem 1007 includes instructions 1011 that when executed by the processor(s) 1005, cause carrying out of the methods described herein.

In some embodiments, the storage subsystem 1007 is configured to store one or more tuning parameters 1013 that can be used to vary some of the processing steps carried out by the processing system 1003.

The system shown in FIG. 10 can be incorporated in a specialized device such as a headset, e.g., a wireless Bluetooth headset. The system also can be part of a general purpose computer, e.g., a personal computer configured to process audio signals.

Thus, embodiments of a suppression system and of a suppression method have been presented. The inventors have noted that it is possible to eliminate significant parts of the target signal without any perceptual distortion. The inventors note that the human brain is rather proficient at error correcting (particularly on voice) and thus many minor distortions in the form of unnecessary or unavoidable spectral suppression would still lead to perceptually pleasing results. It is suspected that provided that the voice is sufficient for intelligibility, high level neurological hearing processes may map back to the perception of a complete voice audio stream. Of course the present invention is not dependent on the correctness of any theory or model suspected to explain why the methods describe herein work. Rather, the invention is limited by the claims included herein, and their legal equivalents.

Thus, an echo suppression system and method, and logic, and instructions that when executed carry out echo suppression have been described, as has a non-transitory computer-readable medium configured with instructions that when executed carry out the method. The system and the method each include an echo suppressor with a nonlinearity introduced in the reference signal path to introduce energy in bands. The preference is that the energy introduced is similar to how any nonlinearity in the physical system introduces energy into spectral bands. Unlike an echo canceller, the echo suppressor is robust to errors in the introduced nonlinearity. The nonlinearity need not be computationally complex. Furthermore, no training of the introduced nonlinearities is required in the embodiments of the system (although training and/or parameter fitting may be used), whereas prior art echo cancelling methods that include modeling nonlinearities require training and/or parameter fitting.

Unless specifically stated otherwise, as apparent from the following description, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

Note also that some expressions may use the logarithm function. While base 10 log functions are used, those skilled in the art would understand that this is not meant to be limiting, and that any base may be used. Furthermore, those skilled in the art would understand that while equal signs were used in several of the mathematical expressions, constants of proportionality may be introduced in an actual implementation, and furthermore, that the ideas therein would still apply if some function with monotonic behavior would be applied to the mathematical expression.

The methodologies described herein are, in some embodiments, performable by one or more processors that accept logic, instructions encoded on one or more non-transitory computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In some embodiments, a non-transitory computer-readable medium is configured with, e.g., encoded with instructions, e.g., logic that when executed by one or more processors of a processing system such as a headset device, a hands free communication device, or a digital signal processing device or subsystem that includes at least one processor element and a storage subsystem, cause carrying out a method as described herein. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Note that while the term power is used, as described in several places in this disclosure, the invention is not limited to use of power, i.e., the weighted sum of the squares of the frequency coefficient amplitudes, and can be modified to accommodate any metric of the amplitude.

All U.S. patents, U.S. patent applications, and International (PCT) patent applications designating the United States cited herein are hereby incorporated by reference. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising element_A and element_B should not be limited to devices consisting of only elements element_A and element_B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, coupled to does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described within the scope of the present invention.

We claim:

1. A signal processing apparatus comprising:
an input transformer and a spectral bander to accept samples of one or more input signals to form a banded frequency-domain amplitude metric of the one or more input signals for a plurality of spectral bands;

a reference signal path to accept one or more reference signals and to form a banded frequency-domain amplitude metric of an echo reference signal representing the one or more reference signals, wherein the reference signal path includes a nonlinear element, such that the banded frequency-domain amplitude metric is of a nonlinearly distorted version of the one or more reference signals;

an adaptive linear filter to accept the banded frequency-domain amplitude metric of the echo reference signal and to determine a frequency-domain amplitude metric of a predicted echo, the adaptive filter using a set of adaptively determined filter coefficients;

a filter coefficient updater coupled to the output of the input transformer and spectral bander and to the output of the adaptive linear filter, the filter coefficient updater to update the filter coefficients;

an echo suppressor coupled to the output of the input transformer and spectral bander and to the output of the adaptive linear filter, the echo suppressor to suppress echoes and to determine an echo-suppressed output signal.

2. A signal processing apparatus as recited in claim 1, wherein the echo suppressor comprises a gain calculator coupled to the output of the input transformer and spectral bander and to the output of the adaptive linear filter, the gain calculator to calculate a set of gains; and a gain applicator coupled to the output of the input transformer and to the gain calculator to apply the set of gains to the input signal and determine echo-suppressed frequency bins of an output signal.

3. A signal processing apparatus as recited in claim 1, wherein the updating of the filter coefficients includes double talk detection to gate updating of the filter coefficients.

4. A signal processing apparatus as recited in claim 1, wherein the apparatus includes an estimator of a banded spectral estimate of a noise amplitude metric, and wherein the echo suppressor uses the estimate of the noise amplitude metric to achieve simultaneous echo suppression and noise suppression.

5. A signal processing apparatus as recited in claim 1, wherein the spacing of the spectral bands is log-like.

6. A signal processing apparatus as recited in claim 1, wherein the spectral bands are perceptually spaced.

7. A signal processing apparatus as recited in claim 1, wherein the reference signal path includes a transformer and a spectral bander, and wherein the nonlinearity precedes the transformer such that the transforming is of a nonlinearly distorted echo reference signal representing the one or more reference signals.

8. A signal processing apparatus as recited in claim 7, wherein the nonlinearity includes a polynomial function.

9. A signal processing apparatus as recited in claim 7, wherein the nonlinearity includes a clipping function.

10. A signal processing apparatus as recited in claim 7, wherein the nonlinearity is determined by measurements.

11. A signal processing apparatus as recited in claim 7, wherein the reference signal path includes a time-to-frequency transformer, and wherein the nonlinearity is after the transforming by the transformer, such that the nonlinearity applies nonlinear distortion in the frequency domain.

12. A signal processing apparatus as recited in claim 11, wherein the nonlinearity distributes power from one or more fundamental components to higher order components in the frequency bin domain, the distribution from a first component to the next higher component being according to an attenuation factor.

13. A signal processing apparatus as recited in claim 12, wherein the amount of power distributed is decayed over time.

14. A signal processing apparatus as recited in claim 1, wherein the frequency domain amplitude metric is frequency domain power.

15. A signal processing apparatus comprising a processing system and configured to suppress undesired signals including echoes, the processing apparatus configured to:

accept an input signal and an echo reference signal, the echo reference representative of one or more reference signals;

determine a transformed frequency bin representation of the input signal for a plurality of frequency bins;

determine a transformed banded representation of an amplitude metric of the input signal for a plurality of spectral bands by spectral banding;

determine a transformed banded representation of an amplitude metric of the reference signal via a reference signal path, wherein the reference signal path includes a nonlinear element, such that the transformed banded representation is of the amplitude metric of a nonlinearly distorted version of the echo reference signal;

linearly filter the transformed banded representation by a filter that uses an adaptively determined set of filter coefficients, the filtering to determine a transformed banded representation of an amplitude metric of an estimate of an echo for suppression;

adaptively update the filter coefficients using the banded representation of the amplitude metric of an estimate of an echo and the banded representation of the amplitude metric of the input signal; and suppress echoes by processing the input signal according to the banded representation of the amplitude metric of an estimate of an echo and the banded representation of the amplitude metric of the input signal in order to determine an output signal.

16. A signal processing apparatus as recited in claim 15, wherein the suppressing includes determining a set of gains to apply to the input signal to determine the output signal.

17. A method comprising:

accepting an input signal and an echo reference signal;

determining a transformed frequency bin representation of the input signal for a plurality of frequency bins;

determining a transformed banded representation of an amplitude metric of the input signal for a plurality of spectral bands;

determining a transformed banded representation of an amplitude metric of the reference signal via a reference signal path, wherein the reference signal path includes a nonlinear element, such that the transformed banded representation is of the amplitude metric of a nonlinearly distorted version of the echo reference signal;

linearly filtering the transformed banded representation by a filter that uses an adaptively determined set of filter coefficients, the filtering to determine a transformed banded representation of an amplitude metric of an estimate of an echo for suppression;

adaptively determining the filter coefficients using the banded representation of the amplitude metric of an estimate of an echo and the banded representation of the amplitude metric of the input signal; and suppressing echoes by processing the input signal according to the banded representation of the amplitude metric of an estimate of an echo and the banded representation of the amplitude metric of the input signal in order to determine an output signal.

18. A method as recited in claim 17, wherein the suppressing includes determining a set of gains to apply to the input signal to determine the output signal.

19. A method as recited in claim 17, wherein the adaptively determining the filter coefficients is gated by a double talk detector.

20. A method as recited in claim 17, further comprising determining an estimate of the amplitude metric spectrum of the echo to use for the suppressing.

21. A method as recited in claim 17, wherein the method includes determining a banded spectral estimate of a noise amplitude metric, and wherein the processing the input signal is further according to the banded spectral estimate of a noise amplitude metric to achieve simultaneous echo suppression and noise suppression.

22. A method as recited in claim 17, wherein the nonlinearity in the reference signal path is in the time-sample domain before the reference signal is transformed.

23. A method as recited in claim 22, wherein the nonlinearity includes a polynomial function.

24. A method as recited in claim 22, wherein the nonlinearity includes a clipping function.

25. A method as recited in claim 17, wherein the nonlinearity in the reference signal path is in the frequency domain.

26. A method as recited in claim 25, wherein the nonlinearity distributes power from one or more fundamental components to higher order components in the frequency bin domain, the distribution from a first component to the next higher component being according to an attenuation factor.

27. A method as recited in claim 26, wherein the amount of power distributed is decayed over time.

28. A method as recited in claim 17, wherein the spacing of the spectral bands is log-like.

29. A non-transitory computer-readable medium configured with instructions that when executed by at least one processor of a processing system, cause processing hardware to carry out a method comprising:

accepting an input signal and an echo reference signal;

determining a transformed frequency bin representation of the input signal for a plurality of frequency bins;

determining a transformed banded representation of an amplitude metric of the input signal for a plurality of spectral bands;

determining a transformed banded representation of an amplitude metric of the reference signal via a reference signal path, wherein the reference signal path includes a nonlinear element, such that the transformed banded representation is of the amplitude metric of a nonlinearly distorted version of the echo reference signal;

linearly filtering the transformed banded representation by a filter that uses an adaptively determined set of filter coefficients, the filtering to determine a transformed banded representation of an amplitude metric of an estimate of an echo for suppression;

adaptively determining the filter coefficients using the banded representation of the amplitude metric of an estimate of an echo and the banded representation of the amplitude metric of the input signal; and suppressing echoes by processing the input signal according to the banded representation of the amplitude metric of an estimate of an echo and the banded representation of the amplitude metric of the input signal in order to determine an output signal.

* * * * *